Nov. 6, 1923. 1,473,570
J. G. LEYNER
STEERING MECHANISM FOR THE TRUCKS OF TRACTORS AND TRACTION ENGINES
Original Filed June 10, 1921  4 Sheets-Sheet 1
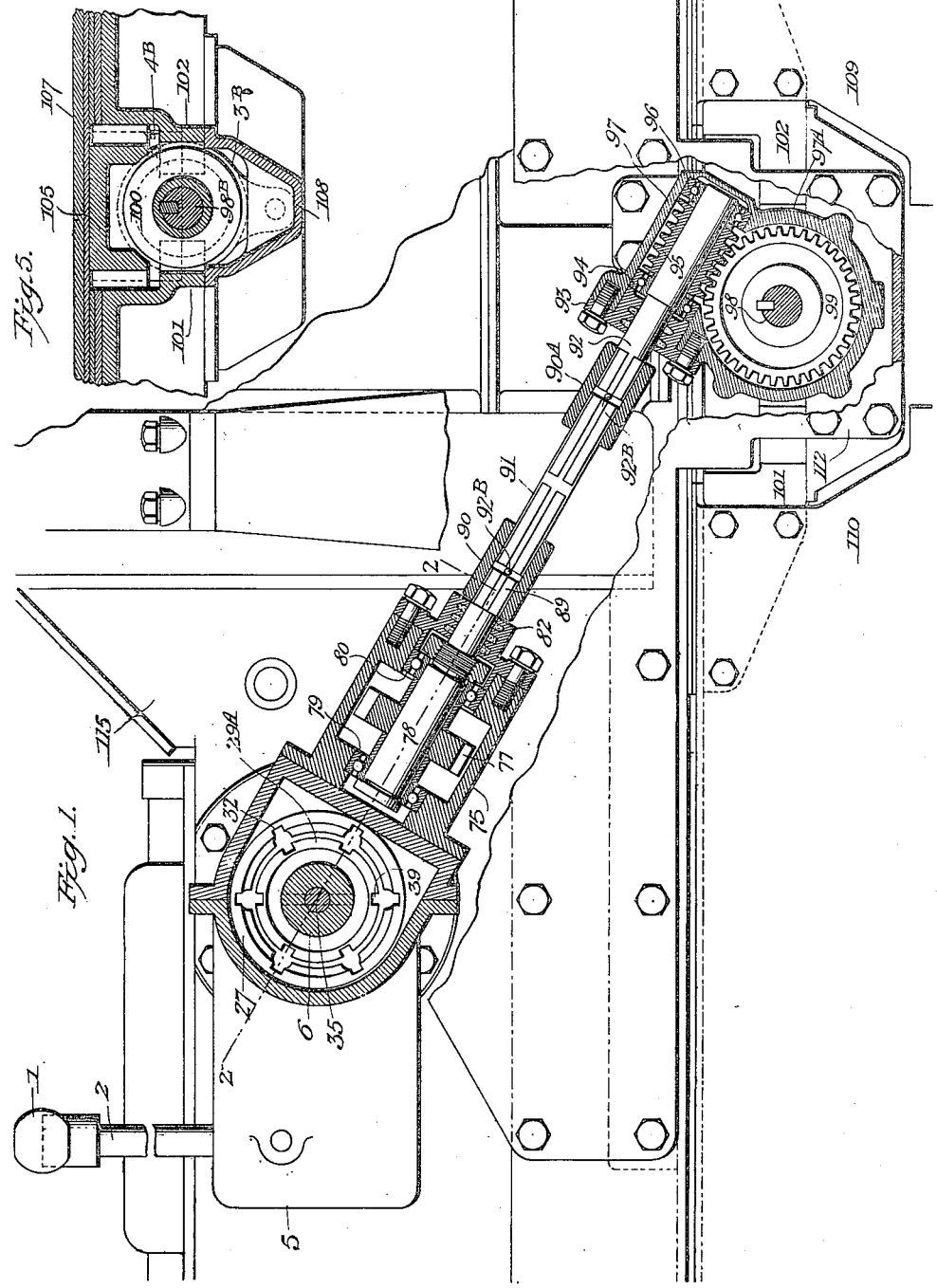

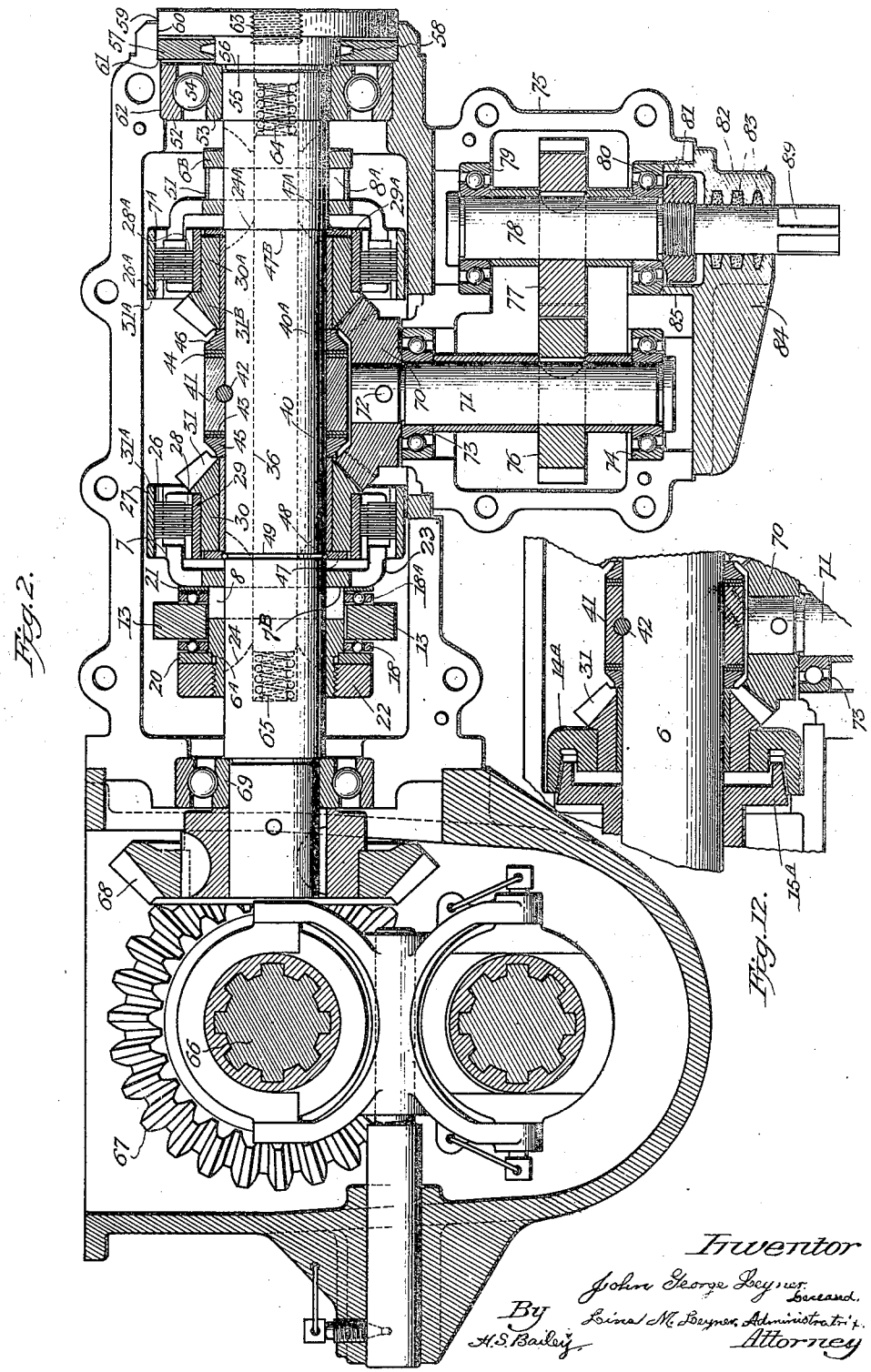

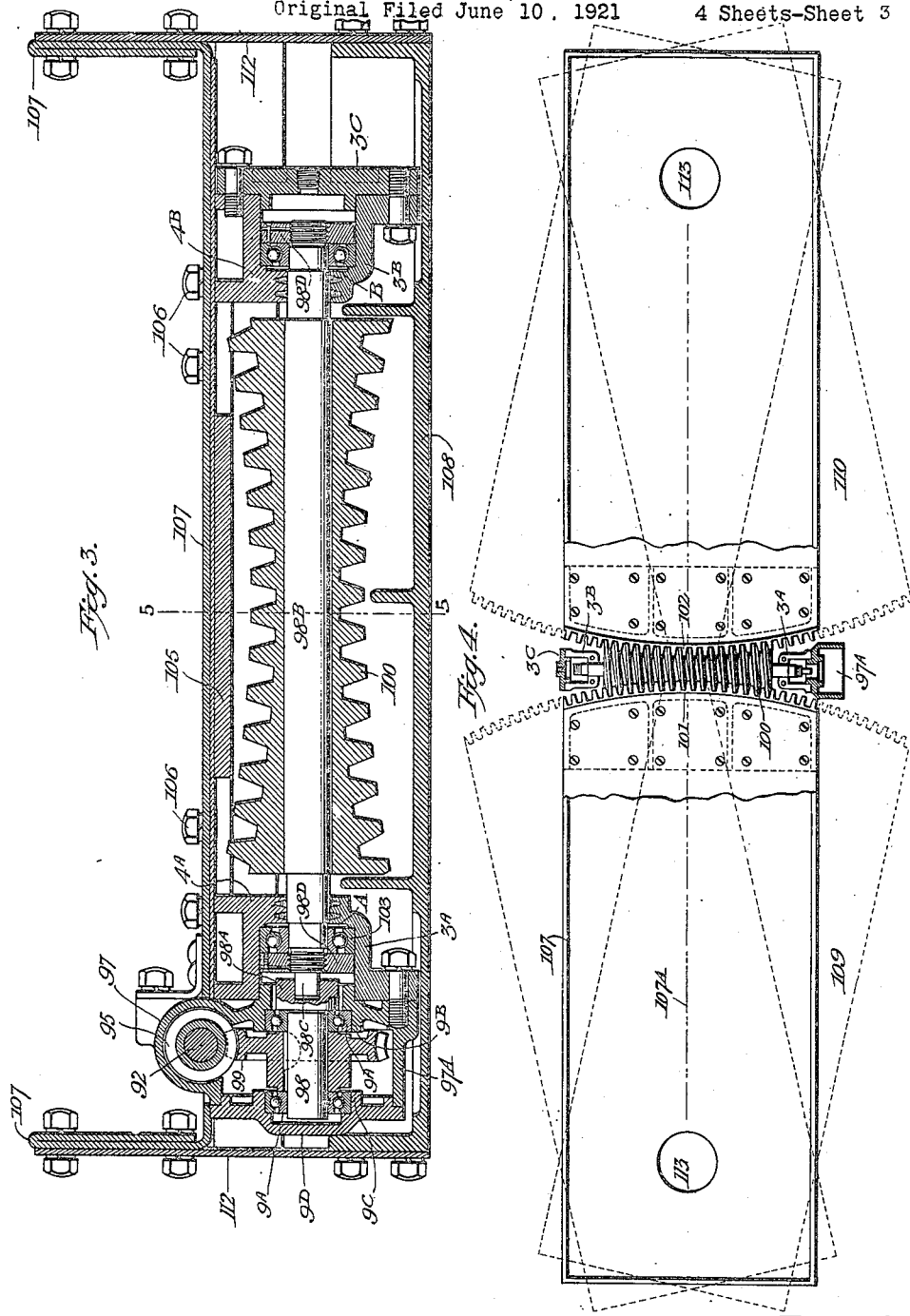

Nov. 6, 1923.  1,473,570
J. G. LEYNER
STEERING MECHANISM FOR THE TRUCKS OF TRACTORS AND TRACTION ENGINES
Original Filed June 10, 1921  4 Sheets-Sheet 4
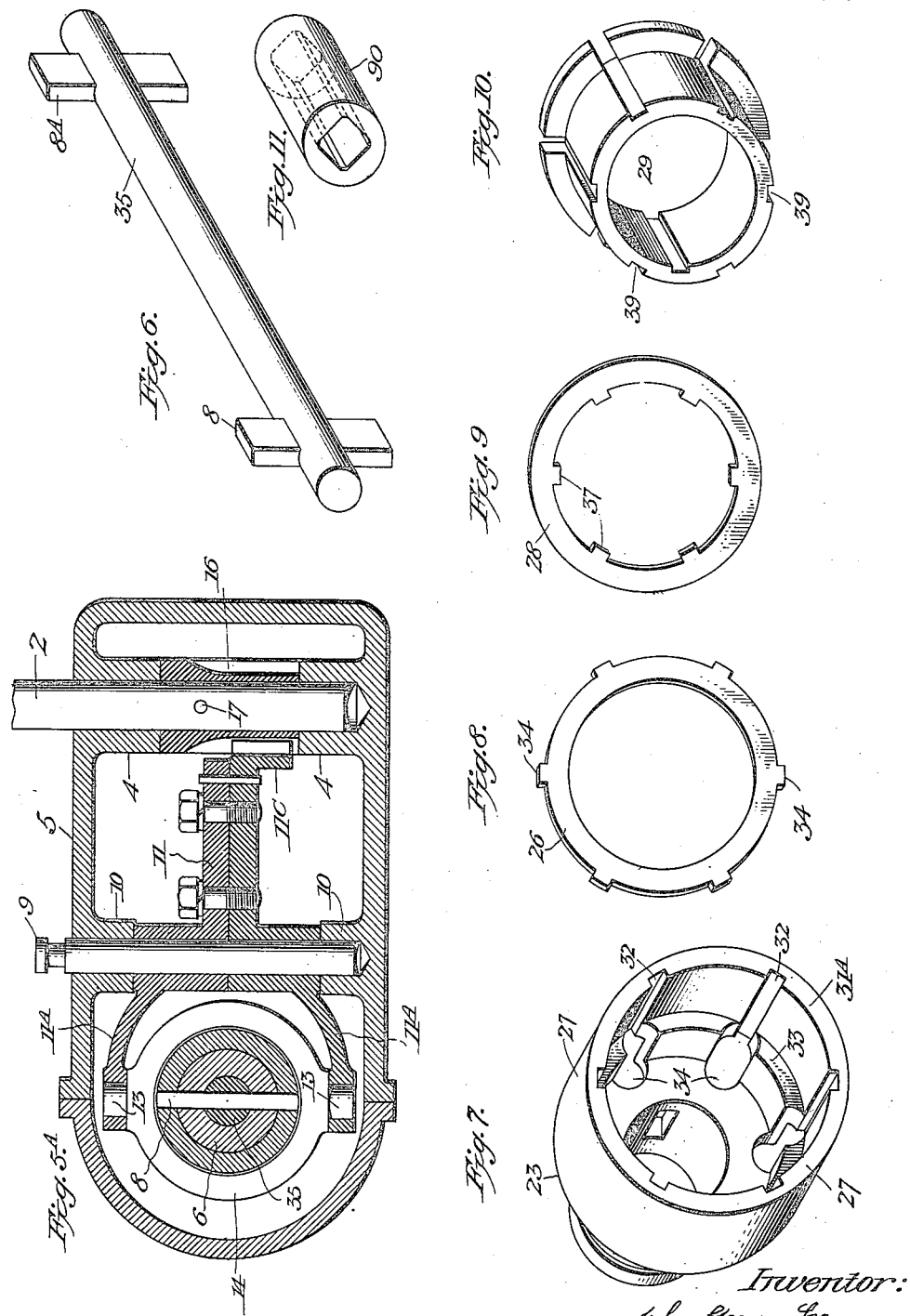
Inventor:
John George Leyner, Deceased.
By Lena M. Leyner, Administratrix
H. S. Bailey,  Attorney Patented Nov. 6, 1923.

1,473,570

UNITED STATES PATENT OFFICE.

JOHN GEORGE LEYNER, DECEASED, LATE OF LITTLETON, COLORADO; BY LINA M. LEYNER, ADMINISTRATRIX, OF LITTLETON, COLORADO.

STEERING MECHANISM FOR THE TRUCKS OF TRACTORS AND TRACTION ENGINES.

Application filed June 10, 1921, Serial No. 476,549. Renewed June 25, 1923.

*To all whom it may concern:*

Be it known that JOHN GEORGE LEYNER, late a citizen of the United States of America and resident of Littleton, county of Arapahoe, and State of Colorado, did invent a new and useful Steering Mechanism for the Trucks of Tractors and Traction Engines, of which the following is a specification.

My invention relates to a new and improved steering mechanism for the trucks of tractors and traction engines, and the objects of my invention are:

First, to provide a power controlled and operating steering mechanism for the trucks of tractors.

Second, to provide a steering mechanism for the trucks of tractors and traction engines, that moves the inner and almost meeting ends of the trucks simultaneously together, either to the right or left hand side of the longitudinal center of the length of the tractor. And Third, to provide a steering mechanism for the end to end arranged endless ground treading tracks of tractors that is reliable in action, and that applies an abundance of power for turning the trucks on rough and uneven ground.

I attain these objects by the mechanism illustrated in the accompanying drawings, in which:

Figure 1, is a vertical, sectional view through the improved steering mechanism as applied to the trucks of a tractor, portions only of the trucks being shown in side elevation.

Fig. 2 is a sectional plan view on the line 2—2 of Figure 1, showing the clutch mechanism by which power is transmitted to the steering mechanism, the upper half of the casing of part of the mechanism being removed.

Fig. 3 is a vertical, longitudinal, sectional view through the worm pinion and its operating mechanism, which turns the tractors in either direction on their pivot bolts.

Fig. 4 is a greatly reduced plan view, showing the tandem tractor trucks, and the worm pinion for turning the trucks on their pivot bolts.

Fig. 5 is a vertical sectional view on the line 5—5 of Figure 3.

Fig. 5$^A$ is a horizontal, sectional view showing the steering post, the clutch operating shaft, and the shifting yoke lever, operated by a pinion on the steering shaft, for bringing either clutch into operation.

Fig. 6 is a perspective view of the steering clutch rod and keys carried thereby, by which the clutch drums are turned with the clutch operating shaft.

Fig. 7 is a perspective view of one of the clutch drums.

Fig. 8 is a perspective view of one of the clutch drum friction rings.

Fig. 9 is a perspective view of one of the clutch center friction rings.

Fig. 10 is a perspective view of one of the clutch centers which support the rings shown in Figure 9.

Fig. 11 is a perspective view of a shaft coupling. And

Fig. 12 is a fragmental sectional view showing a modification in the arrangement of the clutch.

Similar letters of reference refer to similar parts throughout the several views.

Referring to the drawings:

The numeral 1, designates the hand wheel or the hand grasping cross-bar or a single bar projecting to one side only of its supporting post 2, of a steering mechanism embodying my invention, a sectional elevation of which is illustrated in Figure 1.

This post 2, is secured in hub members 4, that are formed in one end of a casing 5, and the opposite end of this casing surrounds loosely a shaft 6, to which the hub members 6$^A$ and 6$^B$, of a pair of sleeves 7 and 7$^A$, are securely keyed by keys 8 and 8$^A$, that extend loosely through the shaft 6, in elongated keyways, as will be presently described.

The hub portions 6$^A$ and 6$^B$, of the sleeves 7, and 7$^A$, are positioned on the shaft 6, at preferably about seven inches apart. These sleeves I call friction clutch sleeves, and they both have a short longitudinal reciprocative movement on the shaft 6, in either direction and either way simultaneously, as will be fully described hereinafter.

The casing 5, is provided with a shaft 9, that is pivotally supported in hub portions 10, that are formed in the casing, and on this shaft 9, I mount a rock-arm lever 11, that has a short gear toothed segment member at one end and a yoke form of terminal end portion 11$^A$, at its opposite end. The ends 11$^A$, of the yoke end of the rock arm are provided with apertures in which trunnions 13, extend that are formed on a thrust ring 14, and this thrust ring surrounds the inner end of the sleeve 7, and in the assembling of the yoke rock arm and this thrust ring together, I find that it is necessary to divide the rock arm centrally of its length into two parts and bolt them together to form the complete rock arm lever 11.

The tooth segment portion of this rock arm is formed on the lower half part 11$^C$, of the rock arm, and this toothed segment portion meshes with a spur tooth pinion 16, that is secured on the steering post 2, by a pin 17.

On the opposite sides of the thrust ring there are ball retaining rings 18 and 18$^A$, and these rings 18 and 18$^A$, are provided with a circumferential row of balls that are loosely confined in apertures formed in them to rotate freely, but are enough larger in diameter than the thickness of the rings so that their diameters project therefrom and bear in rolling engagement with the sides of washers 20 and 21.

The washer 20, is placed between the ring 18 and a nut 22, that is threaded onto the outer end of the hub portion 6$^A$, of the sleeve 7, and the washer 21, is between the ring 18$^A$, and the adjacent side of shoulder 7$^B$, of an enlarged annular inner terminal end portion 23, that forms an integral part of the inner end of the friction clutch sleeve 7. The sleeves 7 and 7$^A$, are keyed to the shaft 6, by keys 8 and 8$^A$, that fit slidably in elongated keyways 24 and 24$^A$, that are formed through the shaft 6, and which are made enough wider than the keys to allow the keys to slide freely in the elongated keyways in the shafts, and at the same time the sleeves 7 and 7$^A$, slide reciprocally and easily endwise on the shaft 6. The reciprocative movement of the keys and the sleeves 7 and 7$^A$, in and on the shaft 6, is about five-sixteenths of an inch from the center of the neutral engaging position, of a plurality of friction clutch disk rings 26, that are secured in an enlarged annular terminal inner end 27, of the sleeve 7, which is made somewhat larger in diameter than the portion of the sleeve 7, that surrounds the shaft 6.

These friction disk rings 26, are placed in operative friction contacting relation to a plurality of similar disk rings 28, that are secured to the inner peripheral surface of a sleeve portion 29, that is keyed on a hub portion 30, that forms a part of a bevel gear 31. This bevel gear 31, is loosely mounted on the shaft 6, and is rotatably driven around the shaft by these two groups of friction disk rings 26 and 28, which are constructed and arranged as follows: The disk rings 26, of the sleeve 7, of which there are six shown, are keyed in the end 27, of the sleeve 7, by means of a circumferential row of spline recesses 32, that are formed in the surface of its inner wall, entirely through the length of this end 27, as these spline recesses extend past an inner radial wall 33, that is formed a little over an inch back from the entrance into the end 31$^A$, of the sleeve 7, and through this wall apertures 34, are formed through which the spline recess cutting tool passes when cutting these spline recesses in the inner wall of the part 27, of the sleeve 7.

The friction disk rings 26, have a circumferential row of projecting splines 34, that project from their peripheral edges, and they are arranged to fit loosely into the spline recesses 32, that are formed in the inner surface of the inner wall of the enlarged annular inner terminal end portion of the sleeve 7. The opposite sleeve 7$^A$, is, as far as its being keyed to the shaft 6, and as to its friction disk rings, are concerned, like the sleeve 7, and the description of the friction disk rings 26, also applies to the disk rings in the sleeve 7$^A$, and the entire construction of the clutch end of the sleeve 7$^A$, and also of its cooperating bevel gear 31$^B$, is like that of the sleeve 7.

The hub 6$^B$, of the sleeve 7$^A$, is mounted on the shaft 6, in similar manner, and it is moved simultaneously with it by a resiliently cushioned actuating rod 35, that is slidably mounted in an aperture 36, that is formed in the axial center of the shaft 6, as will be presently described.

The disks 26 and 26$^A$, of which there are six shown in each of the sleeves 7 and 7$^A$, are preferably made of steel, and they are placed in alternate order between a similar number of the disk rings 28 and 28$^A$, and they are arranged to grip the disk rings 28, with a frictional pressure, as will be fully described hereinafter.

The disk rings 28 and 28$^A$, are keyed loosely by splines 37, formed on their inner peripheral edges, to the outer surface of sleeves 29 and 29$^A$, that are provided with a circumferential row of projecting spline recesses 39, as shown in Figures 8 and 9.

The two oppositely positioned sleeves 29 and 29$^A$, are keyed on the hub portions 30 and 30$^A$, of the bevel gears 31 and 31$^B$, and these bevel gears are mounted rotatably on the shaft 6, and are provided with anti-friction bushings 40 and 40$^A$. Between these two bevel gears 31 and 31$^B$, I secure a collar 41, by a pin 42, to the shaft 6, and at each of the opposite ends of the collar 41, I place two washers 43 and 44, which are mounted loosely on the shaft 6, and against these washers at both ends of the fixed center collar 41, I place abutment collars 45 and 46, which are also loosely mounted on the shaft 6.

At the rear end of the hubs 30 and 30$^A$, the bevel gears 31 and 31^B are placed, and underneath the inner over-hanging end of the sleeves 29 and 29^A, I place washers 47 and 47^A, which fit the shaft 6, closely, and the washer 47, is keyed to the shaft by a round wire ring 48, that sets partially in the groove 49, formed in the shaft 6, and partially in a groove that is formed in the outer side edge of the washers 47, while the washer 47^A, is set against a shoulder 47^B, that is formed on the shaft 6. These washers form abutments that prevent the bevel gears from moving backwardly away from the collars 45 and 46.

The key 8^A, of the hub 6^B, of the sleeve 7^A, is surrounded by a split steel ring 51, to hold it in the shaft 6, against accidental displacement therefrom, and the hub portion 6^B, of this sleeve 7^A, has a movement against the ends of ball bearing collars 52 and 53, that are mounted on the shaft 6, between which a circumferential row of balls 54, is placed in a suitable runway formed between the collars.

The shaft 6, at this end 55, of it is slightly enlarged on the outside edges of the collars, and a shoulder 56, is formed against which the collars bear, and on the outside of the collars, a ring 57, is placed on the shaft, in which a groove 58, is formed that registers against the shaft, and is filled with a packing material.

The shaft 6, is enlarged into a large flange terminal end member 59, that sets in a counterbore 60, formed in the end of the casing 5, in which also the packing ring is placed, which the ball bearing collar 52, is set into and against a shoulder 61, formed in a smaller counterbore 62, that is adjacent to the counterbore 60.

In the axial center of the flanged end 59, of the shaft 6, a plug 63, is threaded, the inner end of which extends against the end of a coiled spring 64, that is placed in the axial bore of the shaft 6, at the outer end of the resiliently cushioning reciprocating rod 35. A similar spring 65, is placed at the opposite end of the rod 35, in the inner end of its bore in the shaft 6.

The keys 8 and 8^A, that extend from the sleeves 7 and 7^A, and in which they fit tightly, and from which they extend loosely through the elongated keyways in the shaft 6, and also extend through this resiliently cushioning reciprocating rod 35, but they fit tightly in this rod 35. Consequently the reciprocal movement of the sleeve 7, which is imparted to it by the yoke end 11^A, of the rock arm 11, is also imparted to this resiliently cushioning reciprocating rod 35; when it is moved in either direction it moves the key 8^A, of the sleeve 7^A, and consequently the sleeve 7^A, which is secured to the hub portion 6^B, of the sleeve 7^A, moves with it, and it is consequently through the medium of this resiliently cushioning reciprocating rod 35, which is driven by the sleeve 7, and its key 8, that the sleeve 7^A, and its clutch disks are moved to operatively engage and release the friction disks of the bevel gear 31^B, and rotate it in unison with the rotatively driven movement of the bevel gear 31, by the sleeve 7, and whenever the sleeve 7, is reciprocated by the yoke end of the rock arm in operating the steering mechanism from its handle or hand wheel, the resiliently cushioning reciprocating rod 35, cushions itself at its opposite ends against the coiled springs 64 and 65.

The shaft 6, is rotated by a driving shaft 66, that extends from the engine motor of the tractor.

I do not illustrate the motor, but the shaft 66, is provided with a bevel gear 67, that is secured on its end, and that meshes with and drives a bevel gear 68, that is secured on the inner end of the shaft 6, which is supported adjacent to the bevel gear 68, in a ball bearing 69, that is housed in the inner end of the casing 5. Consequently, when the engine of the motor is running, its shaft 66, rotates the shaft 6, and the shaft 6, rotates through the medium of the keys 8 and 8^A, the sleeves 7 and 7^A, and these sleeves, when their friction disk rings 26 and 26^A, are thrown into frictional gripping relation with the friction disks 28 and 28^A, rotatively drive the bevel gears 31 and 31^B, and they drive alternately the bevel gear 70 in reverse direction, as will be presently described. This bevel gear 70, is secured on the upper end of a stub shaft 71, by a pin 72, and it is rotatably journaled in bearings 73 and 74, that are formed in a depending part 75, of the casing 5.

A spur gear 76, is secured on the stub shaft 71, which meshes with a spur gear 77, that is mounted on the upper end portion of a shaft 78, that is rotatively mounted in ball bearings 79 and 80, that are housed in the depending part 75, of the casing 5. The upper end of the shaft 78, is provided with an enlarged head portion that rests on the upper ball bearing. The shaft extends through and beyond its lower ball bearing, and a collar nut 81, is threaded on the shaft against the lower side of this lower ball bearing. Below the collar nut 81, the shaft extends through and beyond a flanged packing hub 82, which is secured to the lower end of the casing 5, and in this packing hub, packing grooves 83, are formed, that register on the shaft, and which are filled with a packing material. The packing hub 82, is provided with an inner sleeve member 85, that fits loosely around the collar nut 81. The bevel gear 70, drives the stub shaft 71, and its spur gear 76, rotates and drives the spur gear 77, and its shaft 78, and the lower terminal end of the shaft 78, which projects through and beyond the packing hub 82, is provided with four flattened portions 89, that enable it to be longitudinally inserted in one end of a square apertured coupling sleeve 90, to about a half part of the length of the coupling, the opposite half part of which is placed over one end of a short connecting shaft 91. The opposite end of this connecting shaft 91, is also squared to fit into the squared hole of another coupling 90$^A$, and the opposite end of this coupling 90$^A$, fits over the square end of a stub shaft 92. These two couplings are provided with a tapering pin 90$^B$, that prevents the ends of the shafts from passing the center of the coupling, and thus maintains the couplings in central positions on the ends of the shafts. On the stub shaft 92, adjacent to the lower end of the coupling 90$^A$, I mount loosely a packing flange 93, and at the side of this packing flange I place on the shaft 92, a ball bearing 94, and at the side of the ball bearing I place a worm pinion 95, and at the end of the worm pinion 95, I place a ball bearing 96. The packing flange 93, is secured to one end of a hood shaped casing 97, that surrounds the worm pinion loosely and that supports the ball bearings at the opposite ends of the worm pinion 95.

A circumferential casing 97$^A$, depends from the worm pinion housing hood 97, and a shaft 98, extends rotatably through its center, and a worm gear 99, is keyed on the shaft 98, and meshes with the worm pinion 95. The shaft 98, has a slotted head 98$^A$, in which fits the squared end 98$^C$, of a shaft 98$^B$, and upon the shaft 98$^B$, a worm pinion 100, is secured, which is made in the form of a double tapering worm, which tapers from the center of its length progressively larger in diameter for a short distance on each side of its center, in a curve that permits it to mesh with the worm teeth formed on the peripheral rim of a pair of worm toothed gear segments 101 and 102, that are positioned in a horizontal plane to mesh into the opposite sides of the worm pinion 100, as shown in Figure 4.

The shaft 98$^B$, is supported in the following manner: A bar 105, yoke-shaped in cross section, is secured to the platform 107, by bolts 106, and this bar has depending semi-circular housing members 4$^A$ and 4$^B$, on its respective ends. A casting 3$^A$, is bolted to the inner end of the housing 97$^A$, and this casting has a semi-circular housing which registers with the housing 4$^A$, to form a circular housing A, and a casting 3$^B$, is secured to the opposite end of the bar 105, from the casting 3$^A$, by a cap 3$^C$, which is bolted to the adjoining end of the bar 105, and to the casting 3$^B$, and the casting 3$^B$, has a semi-circular housing which registers with the semi-circular housing 4$^B$, to form a circular housing B, and in the housings A and B, are supported ball bearings 103, in which the opposite end portions of the shaft 98$^B$, are supported, and short portions of the shaft, beyond the bearings, are threaded to receive lock nuts 98$^D$, which engage the bearing rings 103, and prevent endwise movement of the shaft 98$^B$.

The short shaft 98, having the slotted head 98$^A$, is supported in ball bearings 9$^A$, one of which is supported in an axial hub 9$^B$, in the housing 97$^A$, and the other is supported in an axial hub 9$^C$, in a cap 9$^D$, which closes the outer end of the housing 97$^A$. A pan 108, is supported beneath the worm pinion 100, the castings 3$^A$ and 3$^B$, and the housing 97$^A$, by the plates 112, the lower ends of which are bolted to the ends of the said pan.

The worm gear segment 101, is secured to the inner or rear end of the rear truck 109, of a tractor, and the worm gear segment 102, is secured to the rear end of the front truck 110, of a tractor.

I only illustrate a plan view outline of these two trucks. They are, however, operatively secured to the under surface of the tractor platform by two depending plates 112, that are secured to a bottom housing hood, whose upper flat surface forms a sliding support for the under sides of the worm segment members 101 and 102, which are secured to the adjacent ends of the two trucks.

These two end to end trucks to which my steering mechanism is applied, are of the endless ground treading track type of trucks that are used on tractors, and their vertical axes pins 113, are pivotally mounted to permit them to swing in opposite directions from the longitudinal center line 107$^A$, of the platform, either to the right or to the left, depending on which way the steering post 2, is turned; and whenever the steering post is turned, it turns the front truck at an angle to the center line 107$^A$, of the platform and the rear truck at the same angle, but the two trucks point in opposite directions from each other, and the tractor's platform always turns in the direction the front end of the front truck is pointing.

The vertical pins 113, on which the trucks swing, are placed at their extreme front and rear end portions close to the front and also to the rear end of the platform 107, and at the inner almost meeting ends they are provided with the worm toothed segments that mesh with the opposite sides of the curved faced worm pinion 100. I do not fully illustrate these trucks and their endless ground treading tracks, as most of the elements of their construction and arrangement do not form a direct part of the steering mechanism of my present application. I only illustrate the worm toothed segments and their supports, which are elements of my present invention and that are a cooperative part of my present invention. The complete construction and arrangement of these trucks are, however, fully illustrated and described in Patent No. 1,254,819, issued to me January 29, 1918, and also in my pending application, Serial No. 374,723, filed April 17, 1920.

My present steering mechanism is, however, entirely different from the steering mechanism illustrated and described in my above mentioned patent, and is more simple in construction and positive in action and more easily operated.

The rotative movement of the stub shaft 92, and its worm pinion 95, rotates the worm gear 99, and its shaft 98, and the double tapered curved faced worm pinion 100, which imparts a horizontal swinging movement to the trucks on their vertical axes 113, by turning them through the medium of their toothed segments 101 and 102, which are in mesh with the worm pinion 100, and rigidly attached to the trucks 109 and 110. Consequently, both trucks turn in unison and in the same direction at their meeting ends, and in opposite directions at their outer ends, and they are turned to either one side or the other of the longitudinal center line 107$^A$, of the tractor's platform 107, depending on which way the operator turns the steering post 2, by his hand lever or wheel, In Figure 12, I illustrate a modification of the frictional driving medium of my invention. In this modification I dispense with the disk rings and substitute for them, cone-shaped disks 14$^A$ and 15$^A$, which are arranged respectively on the hubs of the gears 31 and 31$^B$, and on the shaft 6. Otherwise, the rest of the mechanism illustrated and described and its operative action is the same.

The operation of my ground treading truck steering mechanism is as follows:

The casing 5, is secured at its outer end by brackets, the lower ends of which are secured to the platform 107, of the tractor, while the inner end of the casing is bolted to the transmission case 115, only a fragment of which is shown. The operator grasps with either or both hands, the steering bar or horizontal cross bar or steering wheel, which is positioned immediately in front of him, and in approximately the same relative position to him as that which the handle bars of a bicycle have with relation to the rider of the bicycle, and which is mounted upon the steering post 2, and the operator varies the course of travel of the tractor by the same relative movements of the steering bar as the bicycle rider varies his course of travel by moving his handle bars, and this movement of the steering bar 1, upon the upper end of the steering post 2, brings about the desired result, by means as described below. When the operator moves the steering bar so as to steer the tractor, that motion is transmitted from the steering bar to the vertical steering post, upon whose upper end it is carried and fastened, causing a partial rotation of this post to the right or left hand, and this rotary or turning movement is transmitted to the yoke lever 11, through the medium of the toothed pinion 16, borne upon the lower portion of the post, which is in engagement with the correspondingly toothed segment 11$^C$, carried upon the adjacent end of the yoke lever 11, and this segmentary movement of the toothed end of the yoke lever, so caused in either direction, is carried through the length of the lever to its yoke end, which is caused to move in the reverse direction from the segment end, as the lever is pivoted near its yoke end by the vertical pivot shaft 9, as hereinbefore described. The yoke end of the yoke lever has lug receiving apertures which carry the lugs of the collar 14, which receives a reciprocating endwise movement on the power driven shaft 6, towards the flanged end of the power driven shaft or towards the gear end of said shaft, according to which direction the steering bar has been moved or turned by the operator, and this axial endwise movement of the collar 14, is in turn imparted from its side faces to and through the ball thrust bearings, into the sleeve 7, which consequently moves in one direction or the other upon the main driving shaft upon which it is slidably mounted, as the collar is moved, while its endwise movement is in turn imparted to the key 8, which transfixes it at right angles to its axis, and the consequent movement of the key is, in turn, passed into the actuating and reciprocating rod 35, which it also transfixes and is tightly fitted to, and the actuating and reciprocating rod 35, through the medium of a similar transfixing key 8$^A$, in its other end, conveys and imparts this endwise motion to the sleeve 7$^A$, so that both sleeves 7 and 7$^A$, move in unison in the same direction and to the same amount.

The sleeves above mentioned, are shown in the neutral or inoperative position in Figure 2, and when endwise movement is imparted to them, one sleeve will be caused to carry the clutch rings 26, which it contains, into frictional contact and pressure engagement with the clutch rings 28, carried upon the sleeve 29, or the sleeve 29$^A$, according to the direction of the endwise movement, while the other sleeve is acted upon by the actuating rod, will be caused to move simultaneously still farther away from the position where its clutch rings would be brought into frictional pressure engagement with the clutch rings upon their corresponding sleeves 29 and 29$^A$. Due to the construction of the power shaft 6, and its transfixing key receiving apertures, as hereinbefore described and illustrated, the sleeve 7 and 7ᴬ, while reciprocally mounted upon it, are still keyed fast to it, so that any rotary movement of the shaft is accompanied by similar rotary movement of the sleeves, imparted to them through the medium of the transfixing keys. In consequence, since the power shaft 6, at all times is rotating at the same speed as the motor of the tractor, from which it receives its power through the medium of the bevel gears 67 and 68, the sleeves 7 and 7ᴬ, their transfixing keys and the actuating or reciprocating rod 35, are also rotating as a single unit with the power shaft 6.

When the steering mechanism is in the neutral or inoperative position, as illustrated, the bevel gears 31 and 31ᴮ, with their hub mounted sleeves, ride upon the rotating power shaft 6, but instead of rotating, remain stationary, as does the bevel gear 70, mounted upon the vertical shaft 71, which is in mesh or toothed engagement with its mating bevel gears 31 and 31ᴮ, and so is held stationary with them.

When an endwise movement has been imparted to the sleeves 7 and 7ᴬ, bringing the clutch disks carried by one or the other of them into frictional pressure contact with the clutch rings carried upon the hub mounted sleeve of the bevel gear upon the side towards which that endwise movement has occurred, the frictional resistance caused by the rapidly revolving disks, carried by the sleeve 7 or 7ᴬ, rotating between the alternating stationary disks carried upon the hub mounted sleeve 29 or 29ᴬ, causes a strong slipping frictional resistance to the continued rotation of the revolving disks, while the stationary disks receive an equally strong frictional resistance to their continued stationary position, and in consequence, they, together with the sleeve and the gear upon which they are mounted, begin to rotate with the power driven disks and so revolve as one with them. Since any movement imparted to the power driven disks is, in turn, imparted to the bevel gear upon which they are mounted, and as both bevel gears are always in mesh with the bevel gear upon the vertical shaft 71, any movement so imparted will therefore drive the bevel gear 70 and its vertical shaft, upon which it is keyed fast, and upon examination of Figure 2, it will be seen that while sleeves 7 and 7ᴬ, together with their driving disks 26, will always drive the bevel gears 31 and 31ᴮ, in the same direction, since the power shaft 6, rotates constantly in the same direction, the gear 70, upon the vertical shaft will be driven in one direction when driven by the bevel gear 31, while it will be driven in the reverse direction when it is driven by the bevel gear 31ᴮ.

The rotary movement of bevel gear 70, and the vertical shaft 71, is imparted to the adjacent vertical shaft 78, through the medium of the two engagingly meshed spur gears 76 and 77, which are mounted upon and keyed fast to their respective shafts, 70 and this rotary movement of shaft 78, is imparted through the coupling 90, to the shaft 91, through the coupling 90ᴬ, to the shaft 92, upon which the worm pinion 95, is keyed fast, and the pinion 95, in consequence, is rotated and drives the worm gear 99, and the shaft 98, upon which it is keyed, and it accordingly revolves the double tapering worm screw 100, which, being in toothed mesh with worm screw segments 101 and 102, causes the inner adjacent ends of the two tractor trucks to swing simultaneously and to the same amount, upon either side of the longitudinal center line of the tractor platform, and so causing the course of the tractor to conform with the will of the operator.

Having described my invention, what I claim as new and desire to secure by Letters Patent, is:

1. In a steering mechanism for the ground treading trucks of tractors, comprising the combination of a shaft driven by the motor of the tractor, and having a cooperating and oppositely arranged set of frictional driving surfaces slidably and reciprocally mounted on said shaft, independent of its rotative movement, and rotatively driven by said shaft, with means comprising a cooperating set of frictional surfaces loosely mounted on said shaft in such cooperative engaging relation as to be engaged by said rotating frictional surfaces, means for connecting said frictional surfaces that are mounted on said shaft with the inner ends of said trucks, in such operative relation as to move said ends simultaneously to either the right hand or the left hand side of said tractor, and means controlled by the operator of said tractor and connected to said rotating shaft's frictional members, for reciprocating said members on said shaft to engage said loosely mounted frictional surfaces with a frictional gripping pressure that is adapted to move the said trucks to steer said tractor as desired by the operator.

2. In a steering device for tractors provided with ground treading trucks, a platform forming a part of said tractor, a hand steering mechanism operatively supported on said platform, gear toothed segments secured to said tractor's ground treading truck, a toothed pinion rotatively supported in mesh with said segments, a power operated shaft rotated by the motor of the tractor, and means including a pair of oppositely positioned sleeves mounted on said shaft, each of which is provided with a plurality of female frictional disk rings, a rod reciprocally mounted in said shaft and keyed to said sleeves for imparting rotative movements to said sleeves, hubbed bevel gears loosely mounted on said shaft, a plurality of male frictional disk rings mounted on said hubbed gears, means for locking the disks of either sleeve frictionally with those on the adjacent gear, and means for connecting said bevel gearing to said toothed pinion.

3. In a steering device for tractors provided with ground treading trucks, a platform forming a part of said tractor, a hand steering mechanism operatively supported on said platform, gear toothed segments secured to said trucks, a toothed pinion rotatively supported in mesh with said segments, and a shaft rotated by the motor of the tractor, and means including a pair of oppositely positioned sleeves mounted on said shaft, each of which is provided with a plurality of female frictional disk rings, a rod reciprocally mounted in said shaft and keyed to said sleeves for imparting rotative movements to said sleeves, hubbed bevel gears loosely mounted on said shaft, means including a plurality of male frictional disk rings mounted on said hubbed gears and including connections arranged to connect the opposing sleeves and their female frictional disk, and means for connecting said bevel gearing to said toothed pinion, comprising a shaft rotated by said gearing and divided into parts that are connected by removable couplings.

4. In a steering device for tractors provided with ground treading trucks, a platform forming a part of said tractor, a hand steering mechanism operatively supported on said platform, gear toothed segments secured to said tractor's ground treading truck, a toothed pinion rotatively supported in mesh with said segments, and means including engaging and disengaging frictional surfaces operatively supported and rotatively connected to said toothed pinion, and means including a power rotated shaft for operating said frictional surfaces to rotate said toothed pinion to move the ground treading truck of said tractor to either the right or left hand of its central position under said tractor's platform, bevel gears loosely mounted on said shaft and adapted to be operated by said friction disks, and means for connecting said bevel gears to said toothed pinion, comprising a shaft rotated by said gearing and divided into parts that are connected by removable couplings, and means connected to the end of said coupling connected shaft and including a worm pinion mounted on the end thereof, a worm pinion in mesh therewith, and means to rotate said truck's toothed segment's operative pinion.

5. In steering mechanism of the character described, the combination with tandem trucks pivotally supported at their outer ends and having outwardly curved toothed racks on their opposing ends; of a correspondingly curved worm pinion between and in mesh with said toothed racks, a power driven shaft, opposing gears slidably but non-rotatably mounted on said shaft, drums slidably but non-rotatably mounted on said shaft, and having portions which surround said gears, friction rings carried by said gears, friction rings carried by said drums, the rings of each drum alternating with those of the adjacent gear, slidable means for connecting said drums to move endwise in unison and for locking said drums to said shaft, means loosely surrounding one of said drums, but non-slidable thereon, a manually operated lever for shifting said means in either direction, whereby the drums are simultaneously moved in the same direction, thereby frictionally locking the rings of one drum and one gear together, an intermediate gear in mesh with both of said opposing gears, and gearing connecting the intermediate gear with the said worm pinion.

6. In a steering mechanism for the trucks of tractors, the combination of the platform and the trucks arranged in end to end alinement under said platform, and pivotally connected at their outer end portions, and having their inner end portions positioned within a few inches of each other, of a gear toothed rack of curved segmental form secured to the inner end of each truck a toothed pinion rotatively supported from said platform between said segment and in mesh with both of said segments, and means including a hand turning lever on said platform and power intermittently and alternately engaging and disengaging surfaces, and a power rotated shaft, and gearing connected to said shaft for rotating said pinion to move said segments to turn the inner ends of said trucks either to the right or left as desired, or to hold them in central end to end relation.

7. In steering mechanism of the character described, the combination with tandem trucks pivotally supported at their outer ends, and having segmental toothed racks on their opposing ends, of a worm pinion between and in mesh with said opposing toothed racks, a power driven shaft, opposing gears loosely mounted on said shaft, an intermediate gear in mesh with both of said loosely mounted gears, means for locking either of said loosely mounted gears to said power driven shaft, and gearing connecting the said intermediate gear with said worm pinion.

8. In steering mechanism of the character described, the combination with tandem trucks pivotally mounted at their outer ends, and having outwardly curved segmental toothed racks on their opposing ends, of a correspondingly curved worm pinion between and in mesh with said opposing toothed racks, a power driven shaft, opposing gears loosely mounted on said shaft, an intermediate gear in mesh with both of said loosely mounted gears, friction means for locking either of said loosely mounted gears to said power driven shaft, and gearing connecting the intermediate gear to said worm pinion.

9. In steering mechanism of the character described, the combination with tandem trucks pivotally mounted at their outer ends and having outwardly curved toothed racks on their opposing ends, of a correspondingly curved worm pinion between and in mesh with said toothed racks, a power driven shaft, opposing gears loosely mounted on said shaft, an intermediate gear in mesh with both of said loosely mounted gears and gearing connecting the intermediate gear with the said worm pinion, clutch mechanisms connected with each of said loosely mounted gears, and slidable means non-rotatably mounted on said shaft, for operating either of said clutch mechanisms to lock its gear to the said shaft.

10. In steering mechanism of the character described, the combination with tandem trucks pivotally mounted at their outer ends, and having outwardly curved toothed racks on their opposing ends, of a correspondingly curved worm pinion between and in mesh with said toothed racks, a squared projection on said worm pinion, a shaft having a slotted head for receiving said squared projection, a worm gear on said shaft, a worm pinion in mesh with said worm gear, and means for rotating said worm pinion in either direction.

11. In steering mechanism of the character described, the combination with tandem trucks pivotally supported at their outer ends and having outwardly curved toothed racks on their opposing ends, of a correspondingly curved worm pinion between and in mesh with said toothed racks, a shaft for said worm pinion having a squared end, a shaft removably coupled to said squared end, and having a worm gear thereon, a worm pinion in mesh with the worm gear, a power driven shaft, opposing gears loosely mounted thereon, a gear in mesh with both loosely mounted gears, and gearing connecting the latter gear with the latter worm pinion, and means for locking either of said loosely mounted gears to the power driven shaft.

12. In steering mechanism, the combination with tandem trucks pivotally supported at their outer ends, and having outwardly curved toothed racks on their opposing ends, of a correspondingly curved worm pinion between and in mesh with said toothed racks, and means for turning said pinion in either direction, whereby said trucks are simultaneously swung on their pivots and in the same direction.

13. In steering mechanism, a power driven shaft, opposing gear wheels loosely but non-slidably mounted thereon, drums slidably but non-rotatably mounted on said shaft, friction elements carried by the said gears and drums, an intermediate gear in mesh with both of said opposing gears, tandem trucks pivotally mounted at their outer ends, their opposing ends being provided with outwardly curved toothed racks, a worm gear between and in mesh with the said toothed racks, gearing connecting the worm pinion and the intermediate gear, and means for sliding said drums simultaneously in the same direction, whereby the friction elements of one drum and one loosely mounted gear are brought into frictional engagement, thereby causing the said gear to turn with the shaft, the friction elements of the other drum and loosely mounted gear being in non-engaging relation.

14. In steering mechanism, the combination with a power driven shaft, opposing hubbed gears rotatably but non-slidably mounted thereon, flanged sleeves rigidly mounted on the hubs of said opposing gears, friction rings slidably but non-rotatably mounted on said sleeves, drums slidably but non-rotatably mounted on said shaft and surrounding said friction rings, friction rings slidably but non-rotatably mounted in said drums, the rings in said drums alternating with those on the said sleeves, means for sliding said drums simultaneously in the same direction, whereby one set of hub and sleeve rings are caused to engage frictionally while the rings of the opposite set are in non-engaging relation, a gear in mesh with both of the opposing gears, a worm pinion and gearing connecting the latter gear and the worm pinion, and tandem trucks having outwardly curved toothed racks on their opposing ends in mesh with said worm pinion, their opposite ends being pivotally mounted.

15. The combination with tandem trucks pivotally mounted at their outer ends, their opposing ends having outwardly curved toothed racks, and a correspondingly curved worm pinion between and in mesh with said racks, of a power driven shaft having an axial bore and slots extending from each end of said bore through the wall of said shaft, a rod slidably mounted in said bore having keys which extend out through said slots, opposing gears rotatably but non-slidably mounted on said shaft, drums slidably mounted on said shaft having hub portions through which said keys pass, clutch members on said drums and said opposing gears, a shifting lever connected to one of said drums whereby, through the medium of said rod, both drums are shifted simultaneously in the same direction, the clutch elements of one drum being thereby brought to engage the clutch elements of the adjacent gear, the clutch elements of the other drum and gear being out of engagement, an intermediate gear in mesh with both of said opposing gears, and gearing connecting said intermediate gear with said worm pinion.

In testimony whereof I affix my signature in presence of two witnesses.

MRS. LINA M. LEYNER,
*Administratrix of the estate of John George Leyner, deceased.*

Witnesses:
THEO BORGSTEDT,
A. D. KINZIE.